United States Patent
Behl (10) Patent No.: US 11,327,908 B2
(45) Date of Patent: May 10, 2022

(54) METHOD AND SYSTEM FOR FACILITATING COMMUNICATION BETWEEN INTERCONNECT AND SYSTEM MEMORY ON SYSTEM-ON-CHIP

(71) Applicant: NXP USA, Inc., Austin, TX (US)

(72) Inventor: Ankur Behl, New Delhi (IN)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 16/929,091

(22) Filed: Jul. 14, 2020

(65) Prior Publication Data

US 2022/0019544 A1   Jan. 20, 2022

(51) Int. Cl.
| | |
|---|---|
| *G06F 13/16* | (2006.01) |
| *G06F 13/36* | (2006.01) |
| *G06F 13/362* | (2006.01) |
| *G06F 9/46* | (2006.01) |

(52) U.S. Cl.
CPC .......... *G06F 13/1668* (2013.01); *G06F 9/467* (2013.01); *G06F 13/362* (2013.01)

(58) Field of Classification Search
None
See application file for complete search history.

(56) References Cited

U.S. PATENT DOCUMENTS

| | | | |
|---|---|---|---|
| 8,364,864 B2 | 1/2013 | Agrawal et al. | |
| 8,886,861 B2 | 11/2014 | Kwon et al. | |
| 9,196,324 B2 | 11/2015 | Haig et al. | |
| 9,613,684 B2 | 4/2017 | Shu et al. | |
| 10,303,628 B2 | 5/2019 | Chan et al. | |
| 2019/0205244 A1* | 7/2019 | Smith | G06F 12/12 |
| 2021/0200879 A1* | 7/2021 | Gerzon | G06F 9/45558 |

FOREIGN PATENT DOCUMENTS

| | | | |
|---|---|---|---|
| GB | 2512996 A | 10/2014 | |
| GB | 2525237 A | 10/2015 | |

\* cited by examiner

*Primary Examiner* — Scott C Sun (57) ABSTRACT

A memory management system for facilitating communication between an interconnect and a system memory of a system-on-chip includes a plurality of memory controllers coupled with the system memory, and processing circuitry coupled with the interconnect and the plurality of memory controllers. The processing circuitry is configured to receive a transaction request from the interconnect, and identify a memory controller of the plurality of memory controllers that is associated with the received transaction request. Further, the processing circuitry is configured to provide the transaction request to the identified memory controller for an execution of a transaction associated with the received transaction request. The processing circuitry is further configured to receive a transaction response to the provided transaction request from the memory controller, and provide the received transaction response to the interconnect after a previous transaction response associated with a previous transaction request is provided to the interconnect.

17 Claims, 3 Drawing Sheets

METHOD AND SYSTEM FOR FACILITATING COMMUNICATION BETWEEN INTERCONNECT AND SYSTEM MEMORY ON SYSTEM-ON-CHIP

BACKGROUND

The present disclosure relates generally to electronic circuits, and, more particularly, to a method and a system for facilitating communication between an interconnect and a system memory on a system-on-chip (SoC).

In a system-on-chip (SoC), an interconnect typically arbitrates communication between various master cores (such as a digital signal processor core, an Ethernet core, a math accelerator, or the like) and a system memory. The interconnect includes various master connectors that communicate with the master cores, a switch that executes arbitration operations, and various slave connectors that communicate with the system memory. The system memory includes various memory segments, and each slave connector communicates with an associated memory segment by way of a memory controller.

A number of slave connectors in the interconnect is typically determined such that a desired throughput of the system memory is achieved. However, a size of the memory segment that is controlled by each memory controller is limited. Thus, for the system memory of a desired size, the number of memory segments, and in turn, a number of memory controllers are typically greater than the number of slave connectors that are required to achieve the desired throughput. As a result, additional slave connectors are required to be included in the interconnect. The additional slave connectors significantly increase a design complexity, a size, and a manufacturing cost of the interconnect, and in turn, of the SoC. Further, as the desired size of the system memory increases with the scalability of the SoC, the design complexity, the size, and the manufacturing cost of the interconnect further increase. Therefore, there exists a need for a method and a system that solves the aforementioned problems associated with existing techniques of facilitating communication between the interconnect and the system memory.

SUMMARY

In one embodiment, a memory management system for facilitating communication between an interconnect and a system memory of a system-on-chip (SoC) is disclosed. The memory management system includes a plurality of memory controllers that is coupled with the system memory, and processing circuitry that is coupled with the interconnect and the plurality of memory controllers. The processing circuitry is configured to receive a first transaction request associated with a first transaction from the interconnect. The first transaction request includes a first memory address of the system memory. The processing circuitry is further configured to identify, from the plurality of memory controllers based on the first transaction request, a first memory controller that is associated with the first memory address. Further, the processing circuitry is configured to provide the first transaction request to the first memory controller for an execution of the first transaction, and receive, from the first memory controller, a first transaction response to the first transaction request. The processing circuitry is further configured to provide the first transaction response to the interconnect after a previous transaction response associated with a previous transaction request is provided to the interconnect.

In another embodiment, a system-on-chip (SoC) is disclosed. The SoC includes a system memory, an interconnect, and a memory management system that is configured to facilitate communication between the interconnect and the system memory. The memory management system includes a plurality of memory controllers that is coupled with the system memory, and processing circuitry that is coupled with the interconnect and the plurality of memory controllers. The processing circuitry is configured to receive, from the interconnect, a first transaction request associated with a first transaction. The first transaction request includes a first memory address of the system memory. The processing circuitry is further configured to identify, from the plurality of memory controllers, a first memory controller that is associated with the first memory address. The first memory controller is identified based on the first transaction request. The processing circuitry is further configured to provide the first transaction request to the first memory controller for an execution of the first transaction. Further, the processing circuitry is configured to receive, from the first memory controller, a first transaction response to the first transaction request, and provide the first transaction response to the interconnect. The first transaction response is provided to the interconnect after a previous transaction response associated with a previous transaction request is provided to the interconnect.

In yet another embodiment, a method for facilitating communication between an interconnect and a system memory of a system-on-chip (SoC) by processing circuitry of a memory management system of the SoC is disclosed. The method includes receiving, from the interconnect, a first transaction request associated with a first transaction. The first transaction request includes a first memory address of the system memory. The method further includes identifying, from a plurality of memory controllers of the memory management system, a first memory controller that is associated with the first memory address. The first memory controller is identified based on the first transaction request. The method further includes providing the first transaction request to the first memory controller for an execution of the first transaction. The method further includes receiving a first transaction response to the first transaction request from the first memory controller, and providing the first transaction response to the interconnect. The first transaction response is provided to the interconnect after a previous transaction response associated with a previous transaction request is provided to the interconnect.

In some examples, the first memory controller is configured to receive the first transaction request from the processing circuitry, execute the first transaction by accessing the first memory address, and generate the first transaction response based on the execution of the first transaction.

In some examples, when the first transaction corresponds to a write operation, the first transaction request further includes first write data, and the first memory controller executes the first transaction by accessing the first memory address to write the first write data. When the first transaction corresponds to a read operation, the first memory controller executes the first transaction by accessing the first memory address to read first read data stored in the system memory. The first transaction response includes the first read data.

In some examples, the processing circuitry is further coupled with a system controller of the SoC, and is configured to receive configuration data associated with configuration of the system memory. The first memory controller is further identified based on the configuration data.

In some examples, the processing circuitry includes a decode controller that is coupled with the interconnect and the system controller. The decode controller is configured to receive the first transaction request and the configuration data, and identify, from the plurality of memory controllers based on the first transaction request and the configuration data, the first memory controller that is associated with the first memory address. The decode controller is further configured to generate first select data that is indicative of the identified first memory controller.

In some examples, the processing circuitry further includes a decoder. The decoder has an input terminal and a select terminal. The input terminal of the decoder is coupled with the interconnect, and is configured to receive the first transaction request. The select terminal of the decoder is coupled with the decode controller, and is configured to receive the first select data. The decoder further has a plurality of output terminals that is coupled with the plurality of memory controllers such that a first output terminal of the plurality of output terminals of the decoder is coupled with the first memory controller. Based on the first select data, the first output terminal is configured to output and provide the first transaction request to the first memory controller.

In some examples, the processing circuitry further includes a first first-in-first-out (FIFO) memory that is coupled with the decode controller, and is configured to receive and store the first select data. The first FIFO memory is further configured to receive a first count, and output the first select data when the first count is incremented from a first value to a second value. The first count is incremented from the first value to the second value when the previous transaction response is provided to the interconnect.

In some examples, the processing circuitry further includes a plurality of FIFO memories that is coupled with the plurality of memory controllers such that a second FIFO memory of the plurality of FIFO memories is coupled with the first memory controller, and is configured to receive and store the first transaction response. The second FIFO memory is further configured to receive a second count, and output the first transaction response when the second count is incremented from a third value to a fourth value. The second count is incremented from the third value to the fourth value when a second transaction response is provided to the interconnect. The second transaction response is a response to a second transaction request that is associated with the first memory controller and is received prior to the first transaction request and the previous transaction request. Further, when the first transaction response is provided to the interconnect, the second count is incremented from the fourth value to a fifth value.

In some examples, the plurality of FIFO memories is further configured to generate a plurality of status bits, respectively. Each status bit of the plurality of status bits is indicative of an occupancy status of a corresponding FIFO memory of the plurality of FIFO memories. Each status bit of the plurality of status bits is deactivated when the corresponding FIFO memory of the plurality of FIFO memories is empty, and activated when the corresponding FIFO memory of the plurality of FIFO memories is occupied.

In some examples, the processing circuitry further includes an encode controller that is coupled with the first FIFO memory and the plurality of FIFO memories. The encode controller is configured to generate and provide the first and second counts to the first and second FIFO memories, respectively. The encode controller is further configured to receive, from the first FIFO memory when the first count is incremented from the first value to the second value, the first select data. Further, the encode controller is configured to receive, from the plurality of FIFO memories, the plurality of status bits, respectively, and identify, from the plurality of FIFO memories, the second FIFO memory that is associated with the first select data. The encode controller is further configured to generate a control signal such that the control signal is activated when a status bit associated with the second FIFO memory is activated.

In some examples, the processing circuitry further includes an encoder. The encoder has a plurality of input terminals that is coupled with the plurality of FIFO memories such that a first input terminal of the plurality of input terminals of the encoder is configured to receive the first transaction response. The encoder further has a select terminal and a control terminal. The select terminal of the encoder is coupled with the first FIFO memory, and is configured to receive the first select data. The control terminal of the encoder is coupled with the encode controller, and is configured to receive the control signal. The encoder further has an output terminal that is coupled with the interconnect, and is configured to output and provide, based on the control signal and the first select data, the first transaction response to the interconnect.

Various embodiments of the present disclosure disclose a memory management system for facilitating communication between an interconnect and a system memory of a system-on-chip (SoC). The memory management system includes a plurality of memory controllers and processing circuitry. The processing circuitry is configured to receive a first transaction request associated with a first transaction from the interconnect. The first transaction request includes a first memory address of the system memory. The processing circuitry is further configured to identify, from the plurality of memory controllers based on the first transaction request, a first memory controller that is associated with the first memory address. Upon identification of the first memory controller, the processing circuitry is further configured to provide the first transaction request to the first memory controller for an execution of the first transaction. The first memory controller is configured to execute the first transaction by accessing the first memory address, and generate a first transaction response to the first transaction request based on the execution of the first transaction. The processing circuitry is further configured to receive the first transaction response from the first memory controller, and provide the first transaction response to the interconnect. The first transaction response is provided to the interconnect after a previous transaction response associated with a previous transaction request is provided to the interconnect.

Thus, the utilization of the processing circuitry in the memory management system of the present disclosure ensures that a number of slave connectors in the interconnect is determined based exclusively on a desired throughput of the system memory. As a result, a design complexity, a size, and a manufacturing cost of the interconnect of the present disclosure are significantly less than that of a conventional interconnect in which the number of slave connectors is determined based on a desired throughput and a desired size of a corresponding system memory. Consequently, a design complexity, a size, and a manufacturing cost of the SoC of the present disclosure are significantly less than that of an SoC including the conventional interconnect. Further, as the number of slave connectors in the interconnect is independent of the desired size of the system memory, an increase in the desired size of the system memory does not lead to an increase in the number of slave connectors. As a result, the design complexity, the size, and the manufacturing cost of the interconnect is unaffected by the increase in the desired size of the system memory. Hence, the scalability of the SoC of the present disclosure is less complex than that of the SoC including the conventional interconnect. Thus, the memory management system of the present disclosure facilitates communication between the interconnect and the system memory in a more efficient manner as compared to conventional systems that facilitate communication between the conventional interconnect and the corresponding system memory.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
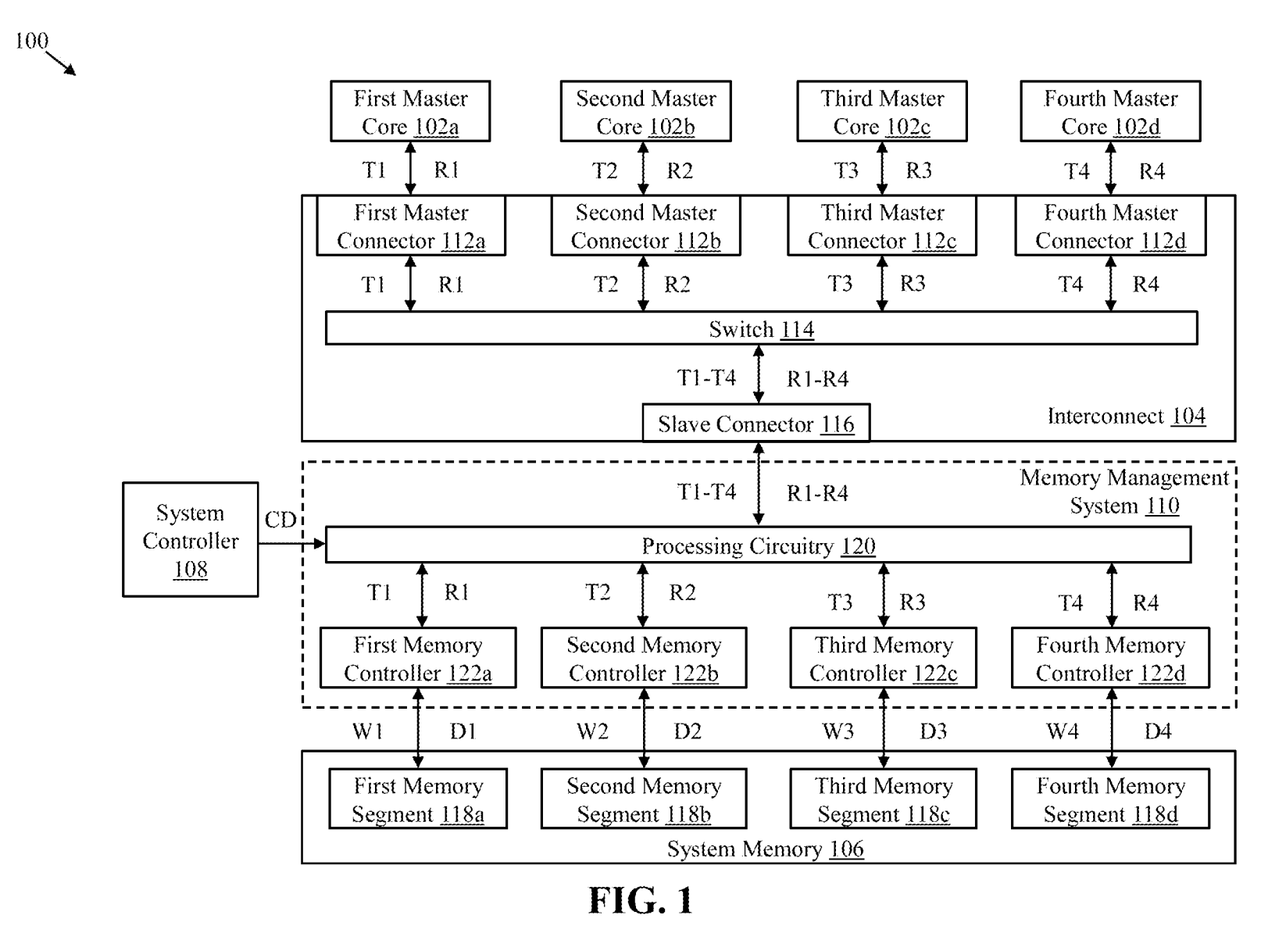
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 includes a plurality of master cores of which first through fourth master cores 102a-102d are shown. The SoC 100 further includes an interconnect 104, a system memory 106, a system controller 108, and a memory management system 110. The SoC 100 may be included in various devices such as automotive devices, mobile devices, network devices, or the like.

The first through fourth master cores 102a-102d are coupled with the interconnect 104, and are configured to generate and provide various transaction requests, such as the first through fourth transaction requests T1-T4, respectively, to the interconnect 104 for initiating various transactions with the system memory 106. In response to the first through fourth transaction requests T1-T4, the first through fourth master cores 102a-102d are further configured to receive various transaction responses, such as first through fourth transaction responses R1-R4, respectively, from the interconnect 104. Each transaction response is thus generated based on an execution of a transaction associated with a corresponding transaction request. For the sake of ongoing discussion, it is assumed that the first through fourth transaction requests T1-T4 are generated to initiate first through fourth transactions with the system memory 106, respectively, and thus include first through fourth memory addresses of the system memory 106. The first through fourth transaction responses R1-R4 are generated based on the execution of the first through fourth transactions, and may be indicative of the completion of the first through fourth transactions, respectively.

The first through fourth transactions may correspond to write operations, read operations, or the like. In an example, when the first through fourth transactions correspond to write operations, the first through fourth transaction requests T1-T4 further include first through fourth write data W1-W4, respectively. The first through fourth write data W1-W4 correspond to data that are to be written to the system memory 106 at the first through fourth memory addresses during the execution of the first through fourth transactions, respectively. In another example, when the first through fourth transactions correspond to read operations, the first through fourth transaction responses R1-R4 include first through fourth read data D1-D4, respectively. The first through fourth read data D1-D4 correspond to data that are stored at the first through fourth memory addresses of the system memory 106, and that are to be read during the execution of the first through fourth transactions, respectively. Examples of the first through fourth master cores 102a-102d may include a digital signal processor core, an Ethernet core, a math accelerator, or the like.

The interconnect 104 is configured to receive the first through fourth transaction requests T1-T4 from the first through fourth master cores 102a-102d, respectively. The interconnect 104 receives the first through fourth transaction requests T1-T4 in a sequential manner. Further, the interconnect 104 is coupled with the memory management system 110, and is configured to provide the first through fourth transaction requests T1-T4 to the memory management system 110 in a sequential manner. The interconnect 104 is further configured to receive the first through fourth transaction responses R1-R4 from the memory management system 110. The first through fourth transaction responses R1-R4 are received in a sequential manner. The interconnect 104 is further configured to provide the first through fourth transaction responses R1-R4 to the first through fourth master cores 102a-102d, respectively, in a sequential manner.

The interconnect 104 includes a plurality of master connectors of which first through fourth master connectors 112a-112d are shown. The interconnect 104 further includes a switch 114 that is coupled with the first through fourth master connectors 112a-112d, and a slave connector 116 that is coupled with the switch 114. For the sake of ongoing discussion, it is assumed that the utilization of a single slave connector (i.e., the slave connector 116) in the interconnect 104 achieves a desired throughput of the system memory 106.

The first through fourth master connectors 112a-112d are coupled with the first through fourth master cores 102a-102d, and are configured to receive the first through fourth transaction requests T1-T4, respectively, in a sequential manner. In an example, the second transaction request T2 is received by the second master connector 112b after the first transaction request T1 is received by the first master connector 112a. The first through fourth master connectors 112a-112d are further configured to provide the first through fourth transaction requests T1-T4 to the switch 114, and receive the first through fourth transaction responses R1-R4 from the switch 114 in a sequential manner, respectively. In an example, the second transaction response R2 is received by the second master connector 112b after the first transaction response R1 is received by the first master connector 112a. Further, the first through fourth master connectors 112a-112d are configured to provide the first through fourth transaction responses R1-R4 to the first through fourth master cores 102a-102d, in a sequential manner, respectively.

The switch 114 is configured to receive the first through fourth transaction requests T1-T4 from the first through fourth master connectors 112a-112d, respectively, and provide the first through fourth transaction requests T1-T4 to the slave connector 116 in a sequential manner. The switch 114 may execute various arbitration operations to provide the first through fourth transaction requests T1-T4 in a sequential manner to the slave connector 116. The switch 114 is further configured to receive the first through fourth transaction responses R1-R4 from the slave connector 116 in a sequential manner, and provide the first through fourth transaction responses R1-R4 to the first through fourth master connectors 112a-112d in a sequential manner, respectively. Examples of the switch 114 may include a crossbar, an interleaver, or the like.

The slave connector 116 is configured to receive the first through fourth transaction requests T1-T4 from the switch 114 in a sequential manner. The slave connector 116 is further coupled with the memory management system 110, and is further configured to provide the first through fourth transaction requests T1-T4 to the memory management system 110 in a sequential manner. Further, the slave connector 116 is configured to receive the first through fourth transaction responses R1-R4 from the memory management system 110 in a sequential manner, and provide the first through fourth transaction responses R1-R4 to the switch 114 in a sequential manner.

The system memory 106 is coupled with the memory management system 110, and is configured to receive and store the first through fourth write data W1-W4. The system memory 106 is further configured to provide stored data as the first through fourth read data D1-D4 to the memory management system 110. The system memory 106 includes a plurality of memory segments of which first through fourth memory segments 118a-118d are shown. Each memory segment of the first through fourth memory segments 118a-118d includes a plurality of memory sub-segments (not shown).

The first through fourth memory addresses are associated with first through fourth memory sub-segments of the first through fourth memory segments 118a-118d, respectively. Thus, the first write data W1 is written to and the first read data D1 is read from the first memory segment 118a (i.e., the first memory sub-segment of the first memory segment 118a), and the second write data W2 is written to and the second read data D2 is read from the second memory segment 118b (i.e., the second memory sub-segment of the second memory segment 118b). Similarly, the third write data W3 is written to and the third read data D3 is read from the third memory segment 118c (i.e., the third memory sub-segment of the third memory segment 118c), and the fourth write data W4 is written to and the fourth read data D4 is read from the fourth memory segment 118d (i.e., the fourth memory sub-segment of the fourth memory segment 118d). In an embodiment, the system memory 106 is a static random-access memory.

The system controller 108 is configured to generate configuration data CD associated with the configuration of the system memory 106. The configuration data CD indicates whether the system memory 106 is segmented into the first through fourth memory segments 118a-118d in an interleaved manner or a non-interleaved manner. When the system memory 106 is segmented into the first through fourth memory segments 118a-118d in an interleaved manner, the configuration data CD may further indicate an interleaving boundary (such as a 64-byte boundary, a 128-byte boundary, or the like) associated with the interleaving of the system memory 106. Similarly, when the system memory 106 is segmented into the first through fourth memory segments 118a-118d in a non-interleaved manner, the configuration data CD may further indicate a range of sequential memory addresses associated with each memory segment of the first through fourth memory segments 118a-118d. The configuration data CD may further indicate a number of memory segments that is associated with the memory management system 110.

The memory management system 110 is configured to facilitate communication between the interconnect 104 and the system memory 106. The memory management system 110 includes processing circuitry 120 and a plurality of memory controllers of which first through fourth memory controllers 122a-122d are shown. The first through fourth memory controllers 122a-122d are coupled with the processing circuitry 120.

The processing circuitry 120 is coupled with the system controller 108, and is configured to receive the configuration data CD. Further, the processing circuitry 120 is coupled with the interconnect 104 (i.e., the slave connector 116), and is configured to receive the first through fourth transaction requests T1-T4 from the interconnect 104 in a sequential manner. The processing circuitry 120 is further configured to identify, from the first through fourth memory controllers 122a-122d, the memory controllers that are associated with the first through fourth memory addresses. For the sake of ongoing discussion, it is assumed that the first through fourth memory controllers 122a-122d are associated with the first through fourth memory addresses, respectively. The first memory controller 122a is selected based on the first transaction request T1 and the configuration data CD. Similarly, the second through fourth memory controllers 122b-122d are selected based on the second through fourth transaction requests T2-T4, respectively, and the configuration data CD.

The processing circuitry 120 is further configured to sequentially provide the first through fourth transaction requests T1-T4 to the first through fourth memory controllers 122a-122d for the execution of the first through fourth transactions, respectively. Further, the processing circuitry 120 is configured to receive, from the first through fourth memory controllers 122a-122d, the first through fourth transaction responses R1-R4, respectively. In one embodiment, the first through fourth transaction responses R1-R4 are received in a sequential manner. In another embodiment, the first through fourth transaction responses R1-R4 are received in a nonsequential manner (e.g., the first transaction response R1 is received after the second transaction response R2). The processing circuitry 120 is further configured to provide the first through fourth transaction responses R1-R4 to the interconnect 104 (i.e., the slave connector 116) in a sequential manner. In an example, the second transaction response R2 is provided to the interconnect 104 after the first transaction response R1 is provided to the interconnect 104.

The first through fourth memory controllers 122a-122d are coupled with the first through fourth memory segments 118a-118d of the system memory 106, and are configured to control memory access operations (i.e., read and write operations) associated with the first through fourth memory segments 118a-118d, respectively. For example, the first through fourth memory controllers 122a-122d are configured to receive the first through fourth transaction requests T1-T4 from the processing circuitry 120, respectively. The first through fourth memory controllers 122a-122d are further configured to execute the first through fourth transactions by accessing the first through fourth memory addresses of the first through fourth memory segments 118a-118d, respectively. Based on the execution of the first through fourth transactions, the first through fourth memory controllers 122a-122d are further configured to generate the first through fourth transaction responses R1-R4 to the first through fourth transaction requests T1-T4, respectively.

When the first through fourth transactions correspond to write operations, the first through fourth memory controllers 122a-122d execute the first through fourth transactions by accessing the first through fourth memory addresses to write the first through fourth write data W1-W4, respectively. Further, when the first through fourth transactions correspond to read operations, the first through fourth memory controllers 122a-122d execute the first through fourth transactions by accessing the first through fourth memory addresses to read the first through fourth read data D1-D4 stored therein, respectively. In such a scenario, the first through fourth transaction responses R1-R4 include the first through fourth read data D1-D4, respectively. The first through fourth memory controllers 122a-122d are further configured to provide the first through fourth transaction responses R1-R4 to the processing circuitry 120, respectively.

Although FIG. 1 describes that the memory management system 110 includes four memory controllers (such as the first through fourth memory controllers 122a-122d), the scope of the present disclosure is not limited to it. In various other embodiments, as a desired size of the system memory 106, and in turn, a number of memory segments increase or decrease, more than or less than four memory controllers may be included in the memory management system 110 and may be coupled with a single processing circuitry (such as the processing circuitry 120), respectively, without deviating from the scope of the present disclosure.

It will be apparent to a person skilled in the art that the scope of the present disclosure is not limited to the interconnect 104 including a single slave connector (such as the slave connector 116). In various other embodiments, the interconnect 104 may include more than one slave connectors based on the desired throughput of the system memory 106, without deviating from the scope of the present disclosure. In such a scenario, each slave connector is coupled with a separate memory management system (such as the memory management system 110). The configuration data CD may further be indicative of a position of one memory management system with respect to other memory management systems.

Figure 2:
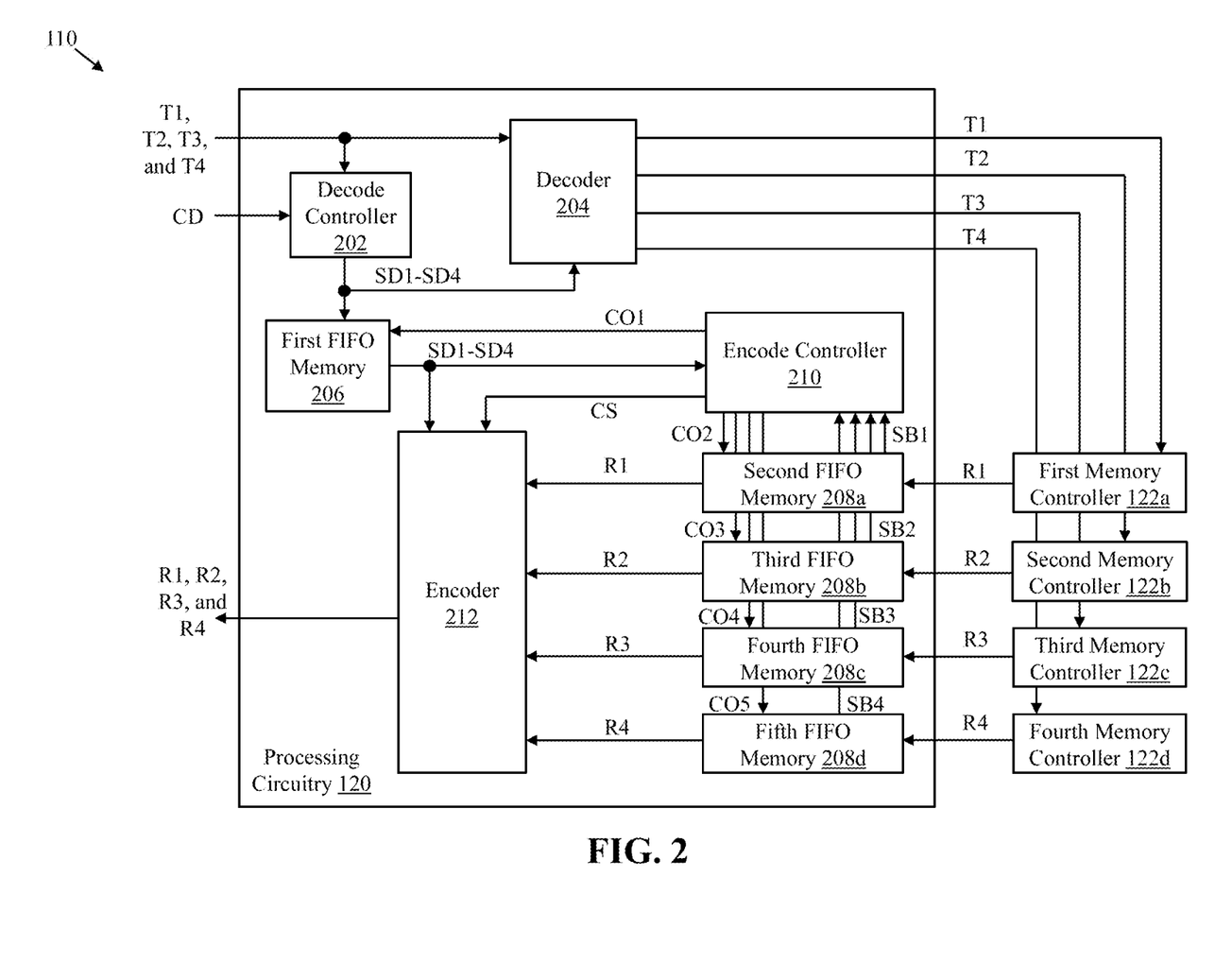
FIG. 2 illustrates a schematic circuit diagram of a memory management system of the SoC of FIG. 1 in accordance with an embodiment of the present disclosure.

FIG. 2 illustrates a schematic circuit diagram of the memory management system 110 in accordance with an embodiment of the present disclosure. The memory management system 110 includes the processing circuitry 120 and the first through fourth memory controllers 122a-122d. The processing circuitry 120 includes a decode controller 202, a decoder 204, a first-in-first-out (FIFO) memory 206 (hereinafter referred to as a "first FIFO memory 206"), second through fifth FIFO memories 208a-208d (collectively referred to as "plurality of FIFO memories 208a-208d"), an encode controller 210, and an encoder 212.

The decode controller 202 is coupled with the interconnect 104 (i.e., the slave connector 116), and is configured to receive the first through fourth transaction requests T1-T4 in a sequential manner. The decode controller 202 is further coupled with the system controller 108, and is further configured to receive the configuration data CD. Based on the first transaction request T1 and the configuration data CD, the decode controller 202 is further configured to identify, from the first through fourth memory controllers 122a-122d, the first memory controller 122a that is associated with the first memory address. Similarly, based on the second through fourth transaction requests T2-T4 and the configuration data CD, the decode controller 202 is further configured to identify, from the first through fourth memory controllers 122a-122d, the second through fourth memory controllers 122b-122d that are associated with the second through fourth memory addresses, respectively. Further, the decode controller 202 is configured to generate, in a sequential manner, first through fourth select data SD1-SD4 that are indicative of the identified first through fourth memory controllers 122a-122d, respectively.

The decoder 204 has an input terminal and a select terminal. The input terminal of the decoder 204 is coupled with the interconnect 104 (i.e., the slave connector 116), and is configured to receive the first through fourth transaction requests T1-T4 in a sequential manner. The select terminal of the decoder 204 is coupled with the decode controller 202, and is configured to receive the first through fourth select data SD1-SD4, in a sequential manner Thus, when the input terminal of the decoder 204 receives the first transaction request T1, the select terminal of the decoder 204 receives the first select data SD1. Similarly, when the input terminal of the decoder 204 receives the second through fourth transaction requests T2-T4, the select terminal of the decoder 204 receives the second through fourth select data SD2-SD4, respectively.

The decoder 204 further has a plurality of output terminals of which first through fourth output terminals are shown. The first through fourth output terminals are coupled with the first through fourth memory controllers 122a-122d, respectively. Based on the first through fourth select data SD1-SD4, the first through fourth output terminals are configured to output and provide the first through fourth transaction requests T1-T4 to the first through fourth memory controllers 122a-122d in a sequential manner, respectively. Upon reception of the first through fourth transaction requests T1-T4, the first through fourth memory controllers 122a-122d execute the first through fourth transactions, and generate the first through fourth transaction responses R1-R4, respectively.

The first FIFO memory 206 is coupled with the decode controller 202, and is configured to receive and store the first through fourth select data SD1-SD4 in a sequential manner. In an example, the second select data. SD2 is stored in the first FIFO memory 206 after the first select data SD1 is stored. It will be apparent to a person skilled in the art that the first through fourth select data SD1-SD4 are stored in the first FIFO memory 206 in accordance with a communication protocol associated with the SoC 100.

The first FIFO memory 206 is further configured to receive a first count CO1, and output the first through fourth select data SD1-SD4 based on the first count CO1. When the first count CO1 is incremented from one value to another, corresponding select data is outputted. In an example, when the first count CO1 is incremented from a first value to a second value, the first select data SD1 is outputted, and when the first count CO1 is incremented from the second value to a third value, the second select data SD2 is outputted. The first count CO1 is incremented from the first value to the second value when a fifth transaction response (not shown) is provided to the interconnect 104. The fifth transaction response is a response to a fifth transaction request (not shown) that is received from the interconnect 104 (i.e., the slave connector 116) prior to the first transaction request T1. Similarly, the first count CO1 is incremented from the second value to the third value when the first transaction response R1 (i.e., a response to the first transaction request T1 that is received prior to the second transaction request T2) is provided to the interconnect 104. Additionally, the first count CO1 is incremented from the third value to a fourth value when the second transaction response R2 is provided to the interconnect 104.

The second through fifth FIFO memories 208a-208d are coupled with the first through fourth memory controllers 122a-122d, respectively, and are configured to receive and store the first through fourth transaction responses R1-R4 that are generated by the first through fourth memory controllers 122a-122d, respectively. It will be apparent to a person skilled in the art that the first through fourth transaction responses R1-R4 are stored in the second through fifth FIFO memories 208a-208d in accordance with the communication protocol associated with the SoC 100, respectively. The second through fifth FIFO memories 208a-208d are further configured to receive second through fifth counts CO2-CO5, respectively. Based on the second through fifth counts CO2-CO5, the second through fifth FIFO memories 208a-208d are further configured to output the stored first through fourth transaction responses R1-R4, respectively.

The first transaction response R1 is outputted by the second FIFO memory 208a when the second count CO2 is incremented from a fifth value to a sixth value. The second count CO2 is incremented from the fifth value to the sixth value when a sixth transaction response (not shown) is provided to the interconnect 104. The sixth transaction response is a response to a sixth transaction request (not shown) that is associated with the first memory controller 122a, and is received prior to the first through fourth transaction requests T1-T4. Further, when the first transaction response R1 is provided to the interconnect 104, the second count CO2 is incremented from the sixth value to a seventh value. Similarly, the second transaction response R2 is outputted by the third FIFO memory 208b when the third count CO3 is incremented from an eighth value to a ninth value. The third count CO3 is incremented from the eighth value to the ninth value when a seventh transaction response (not shown) is provided to the interconnect 104. The seventh transaction response is a response to a seventh transaction request (not shown) that is associated with the second memory controller 122b, and is received prior to the first through fourth transaction requests T1-T4. Further, when the second transaction response R2 is provided to the interconnect 104, the third count CO3 is incremented from the ninth value to a tenth value.

The third transaction response R3 is outputted by the fourth FIFO memory 208c when the fourth count CO4 is incremented from an eleventh value to a twelfth value. The fourth count CO4 is incremented from the eleventh value to the twelfth value when an eighth transaction response (not shown) is provided to the interconnect 104. The eighth transaction response is a response to an eighth transaction request (not shown) that is associated with the third memory controller 122c, and is received prior to the first through fourth transaction requests T1-T4. Further, when the third transaction response R3 is provided to the interconnect 104, the fourth count CO4 is incremented from the twelfth value to a thirteenth value. Similarly, the fourth transaction response R4 is outputted by the fifth FIFO memory 208d when the fifth count CO5 is incremented from a fourteenth value to a fifteenth value. The fifth count CO5 is incremented from the fourteenth value to the fifteenth value when a ninth transaction response (not shown) is provided to the interconnect 104. The ninth transaction response is a response to a ninth transaction request (not shown) that is associated with the fourth memory controller 122d, and is received prior to the first through fourth transaction requests T1-T4. Further, when the fourth transaction response R4 is provided to the interconnect 104, the fifth count CO5 is incremented from the fifteenth value to a sixteenth value.

The second through fifth FIFO memories 208a-208d are further configured to generate first through fourth status bits SB1-SB4 (collectively referred to as a "plurality of status bits SB1-SB4") that are indicative of occupancy statuses of the second through fifth FIFO memories 208a-208d, respectively. In an embodiment, the first through fourth status bits SB1-SB4 are deactivated (i.e., are at logic low states), when the second through fifth FIFO memories 208a-208d are empty, and are activated (i.e., are at logic high states) when the second through fifth FIFO memories 208a-208d are occupied (i.e., store at least one transaction response), respectively.

The encode controller 210 is coupled with the first FIFO memory 206 and the second through fifth FIFO memories 208a-208d, and is configured to generate and provide the first count CO1 to the first FIFO memory 206, and the second through fifth counts CO2-CO5 to the second through fifth FIFO memories 208a-208d, respectively. The encode controller 210 is further configured to receive, from the first FIFO memory 206, the first through fourth select data SD1-SD4 in a sequential manner. In an example, the first select data SD1 is received when the first count CO1 is incremented from the first value to the second value, and the second select data SD2 is selected when the first count CO1 is incremented from the second value to the third value.

The encode controller 210 is further configured to receive, from the second through fifth FIFO memories 208a-208d, the first through fourth status bits SB1-SB4, respectively. When the first select data SD1 is received, the encode controller 210 is further configured to identify, from the second through fifth FIFO memories 208a-208d, the second FIFO memory 208a that is associated with the first select data SD1 (i.e., the second FIFO memory 208a that is coupled with the first memory controller 122a). Similarly, when the second through fourth select data SD2-SD4 are received, the encode controller 210 is further configured to identify, from the second through fifth FIFO memories 208a-208d, the third through fifth FIFO memories 208b-208d that are associated with the second through fourth select data SD2-SD4, respectively.

The encode controller 210 is further configured to generate a control signal CS. The control signal CS is activated (i.e., is at a logic high state) when a select data is received and when a FIFO memory associated with the received select data is occupied (i.e., a status bit associated with the corresponding FIFO memory is activated). In an example, when the first select data SD1 is received, the control signal CS is activated when the first status bit SB1 associated with the second FIFO memory 208a is activated. The control signal CS is deactivated (i.e., is at a logic low state) when a transaction response associated with the received select data is provided to the interconnect 104 by the encoder 212. In an example, the control signal CS is deactivated when the first transaction response R1 is provided to the interconnect 104.

The encoder 212 has a plurality of input terminals of which first through fourth input terminals are shown. The first through fourth input terminals of the encoder 212 are coupled with the second through fifth FIFO memories 208a-208d, and are configured to receive the first through fourth transaction responses R1-R4 that are stored in the second through fifth FIFO memories 208a-208d, respectively. The encoder 212 further has a select terminal and a control terminal. The select terminal of the encoder 212 is coupled with the first FIFO memory 206, and is configured to receive the first through fourth select data SD1-SD4 in a sequential manner. The control terminal of the encoder 212 is coupled with the encode controller 210, and is configured to receive the control signal CS.

The encoder 212 further has an output terminal that is coupled with the interconnect 104 (i.e., the slave connector 116), and is configured to output and provide, based on the control signal CS and the first through fourth select data SD1-SD4 the first through fourth transaction responses R1-R4 to the interconnect 104, respectively. For example, when the first select data SD1 is received by the select terminal of the encoder 212 and the control signal CS is activated, the output terminal of the encoder 212 outputs and provides the first transaction response R1 to the interconnect 104.

In operation, the first through fourth master cores 102a-102d generate the first through fourth transaction requests T1-T4 for initiating the first through fourth transactions with the system memory 106, respectively. Further, the first through fourth master cores 102a-102d provide the first through fourth transaction requests T1-T4 to the first through fourth master connectors 112a-112d, respectively, in a sequential manner. The first through fourth master connectors 112a-112d then provide the first through fourth transaction requests T1-T4 to the switch 114 in a sequential manner, respectively. The switch 114 then provides, by executing various arbitration operations, the first through fourth transaction requests T1-T4 to the slave connector 116 in a sequential manner, and the slave connector 116 further sequentially provides the first through fourth transaction requests T1-T4 to the processing circuitry 120 (i.e., the decode controller 202 and the input terminal of the decoder 204).

As the processing circuitry 120 receives the first through fourth transaction requests T1-T4 sequentially, the processing circuitry 120 receives the first transaction request T1 before the second through fourth transaction requests T2-T4. The decode controller 202 identifies, from the first through fourth memory controllers 122a-122d, the first memory controller 122a that is associated with the first memory address of the first transaction request T1. Further, the decode controller 202 generates the first select data SD1 that is indicative of the identified first memory controller 122a. The first select data SD1 is provided to the select terminal of the decoder 204 and the first FIFO memory 206. The first FIFO memory 206 receives and stores the first select data SD1. The decoder 204 (i.e., the first output terminal of the decoder 204) outputs and provides, based on the first select data SD1, the first transaction request T1 to the first memory controller 122a.

The processing circuitry 120 then receives the second transaction request T2. The decode controller 202 identifies, from the first through fourth memory controllers 122a-122d, the second memory controller 122b that is associated with the second memory address of the second transaction request T2. Further, the decode controller 202 generates the second select data. SD2 that is indicative of the identified second memory controller 122b. The second select data SD2 is provided to the select terminal of the decoder 204 and the first FIFO memory 206. The first FIFO memory 206 receives and stores the second select data SD2. The decoder 204 (i.e., the first output terminal of the decoder 204) outputs and provides, based on the second select data SD2, the second transaction request T2 to the second memory controller 122b. Similarly, when the third and fourth transaction requests T3 and T4 are received by the processing circuitry 120, the corresponding third and fourth select data SD3 and SD4 are generated. Based on the third and fourth select data SD3 and SD4, the third and fourth transaction requests T3 and T4 are provided to the third and fourth memory controllers 122c and 122d, respectively. Further, the third and fourth select data SD3 and SD4 are stored in the first FIFO memory 206 in a sequential manner.

The first through fourth memory controllers 122a-122d execute the first through fourth transactions by accessing the first through fourth memory addresses, and generate the first through fourth transaction responses R1-R4, respectively. When the first through fourth transactions correspond to write operations, the first through fourth memory controllers 122a-122d access the first through fourth memory addresses of the first through fourth memory segments 118a-118d to write the first through fourth write data W1-W4, respectively. In such a scenario, the first through fourth transaction responses R1-R4 are indicative of the completion of the first through fourth transactions (i.e., write operations), respectively. Similarly, when the first through fourth transactions correspond to read operations, the first through fourth memory controllers 122a-122d access the first through fourth memory addresses of the first through fourth memory segments 118a-118d to read the first through fourth read data D1-D4 stored therein. The first through fourth transaction responses R1-R4 are indicative of the completion of the first through fourth transactions (i.e., read operations), and include the first through fourth read data. D1-D4, respectively.

The second through fifth FIFO memories 208a-208d receive and store the first through fourth transaction responses R1-R4 from the first through fourth memory controllers 122a-122d, respectively. For the sake of ongoing discussion, it is assumed that the second transaction response R2 is received before the first transaction response R1.

Prior to the reception of the second transaction response R2, the first count CO1 is incremented from the first value to the second value. Thus, the first FIFO memory 206 outputs the first select data SD1. The encode controller 210 receives the first select data SD1, and identifies the second FIFO memory 208a that is associated with the first select data SD1. The encode controller 210 further receives the first through fourth status bits SB1-SB4 from the second through fifth FIFO memories 208a-208d, respectively. For the sake of ongoing discussion, it is assumed that the second count CO2 is incremented from the fifth value to the sixth value (i.e., the sixth transaction response is provided to the interconnect 104), and the third count CO3 is incremented from the eighth value to the ninth value (i.e., the seventh transaction response is provided to the interconnect 104).

When the second transaction response R2 is received from the second memory controller 122b and the first transaction response R1 is yet to be received, the first status bit SB1 is deactivated (as the second FIFO memory 208a is empty) and the second status bit SB2 is activated (as the third FIFO memory 208b stores the second transaction response R2). As the third count CO3 is incremented to the ninth value, the second memory controller 122b outputs the second transaction response R2. However, as the first status bit SB1 that is associated with the second FIFO memory 208a is deactivated, the control signal CS is deactivated. As a result, the encoder 212 is disabled and the second transaction response R2 is not provided to the interconnect 104.

When the first transaction response R1 is received and stored in the second FIFO memory 208a, the first status bit SB1 is activated. As a result, the control signal CS is activated. Further, as the second count CO2 is incremented to the sixth value, the second FIFO memory 208a outputs the first transaction response R1. As the select terminal of the encoder 212 receives the first select data SD1, the encoder 212 (i.e., the output terminal of the encoder 212) outputs and provides the first transaction response R1 to the interconnect 104 (i.e., the slave connector 116).

When the first transaction response R1 is provided to the interconnect 104, the control signal CS is deactivated, the first count CO1 is incremented from the second value to the third value, and the second count CO2 is incremented from the sixth value to the seventh value. As the first count CO1 is incremented from the second value to the third value, the first FIFO memory 206 outputs the second select data SD2. The encode controller 210 receives the second select data SD2, and identifies the third FIFO memory 208b that is associated with the second select data SD2. As the second status bit SB2 associated with the third FIFO memory 208b is activated, the control signal CS is activated. Further, as the select terminal of the encoder 212 receives the second select data SD2, the encoder 212 (i.e., the output terminal of the encoder 212) outputs and provides the second transaction response R2 to the interconnect 104 (i.e., the slave connector 116). When the second transaction response R2 is provided to the interconnect 104, the control signal CS is deactivated, the first count CO1 is incremented from the third value to the fourth value, and the third count CO3 is incremented from the ninth value to the tenth value. Similarly, the third and fourth transaction responses R3 and R4 are provided to the interconnect 104 in a sequential manner even though the fourth transaction response R4 may be received from the fourth memory controller 122d before the third transaction response R3 is received from the third memory controller 122c. Thus, the memory management system 110 ensures that the first through fourth transaction responses R1-R4 are provided to the interconnect 104 in the order that is same as the order in which the first through fourth transaction requests T1-T4 are received from the interconnect 104.

The slave connector 116 then provides the first through fourth transaction responses R1-R4 in a sequential manner to the switch 114. The switch 114 then provides the first fourth transaction responses R1-R4 to the first through fourth master connectors 112a-112d, respectively. The first through fourth master connectors 112a-112d then provide the first through fourth transaction responses R1-R4 to the first through fourth master cores 102a-102d, respectively.

Figure 3:
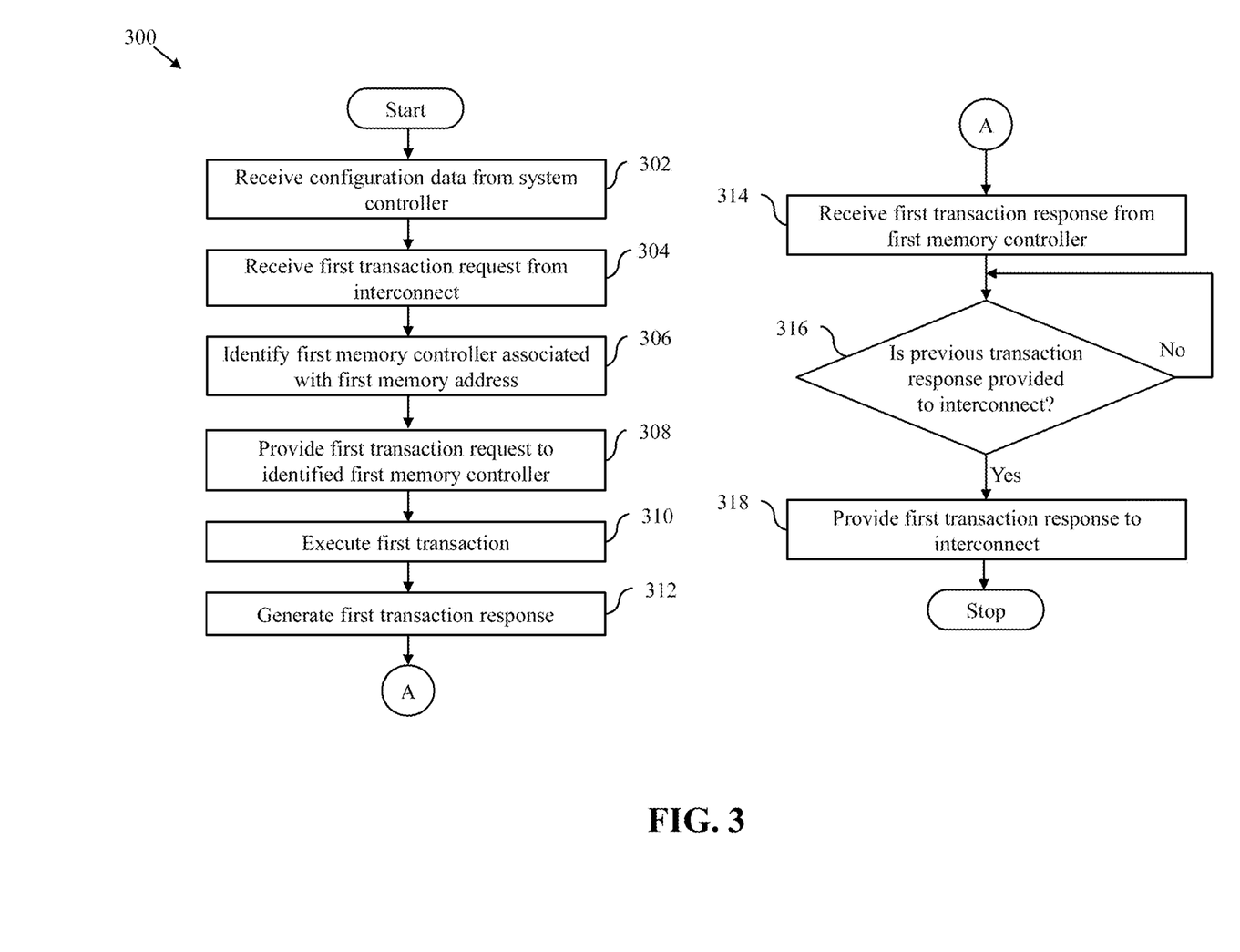
FIG. 3 represents a flowchart that illustrates a method for facilitating communication between an interconnect of the SoC of FIG. 1 and a system memory of the SoC of FIG. 1 by the memory management system in accordance with an embodiment of the present disclosure.

FIG. 3 represents a flowchart 300 that illustrates a method for facilitating communication between the interconnect 104 and the system memory 106 by the memory management system 110 in accordance with an embodiment of the present disclosure. At step 302, the processing circuitry 120 of the memory management system 110 receives the configuration data CD from the system controller 108. At step 304, the processing circuitry 120 receives the first transaction request T1 from the interconnect 104.

At step 306, the processing circuitry 120 identifies, from the first through fourth memory controllers 122a-122d of the memory management system 110, the first memory controller 122a that is associated with the first memory address included in the first transaction request T1. The processing circuitry 120 identifies the first memory controller 122a based on the first transaction request T1 and the configuration data CD. At step 308, the processing circuitry 120 provides the first transaction request T1 to the identified first memory controller 122a.

At step 310, the first memory controller 122a executes the first transaction by accessing the first memory address. At step 312, the first memory controller 122a generates, based on the execution of the first transaction, the first transaction response R1 as a response to the first transaction request T1.

At step 314, the processing circuitry 120 receives the first transaction response R1 from the first memory controller 122a. At step 316, the processing circuitry 120 determines whether a previous transaction response (e.g., the fifth transaction response) associated with a previous transaction request (e.g., the fifth transaction request) is provided to the interconnect 104. If at step 316, the processing circuitry 120 determines that the previous transaction response is not provided to the interconnect 104, step 316 is performed (i.e., the method is halted until the previous transaction response is received from a memory controller of the first through fourth memory controllers 122a-122d, and is provided to the interconnect 104). If at step 316, the processing circuitry 120 determines that the previous transaction response is provided to the interconnect 104, step 318 is performed. At step 318, the processing circuitry 120 provides the first transaction response R1 to the interconnect 104. Thus, the first transaction response T1 is provided to the interconnect 104 exclusively after the previous transaction response is provided to the interconnect 104.

It will be apparent to a person skilled in the art that the second through fourth transaction responses R2-R4 that are associated with the second through fourth transaction requests T2-T4, respectively, are provided to the interconnect 104 in a similar manner as described above. In other words, the second transaction response R2 is provided to the interconnect 104 after the first transaction response R1 is provided to the interconnect 104. Similarly, the third transaction response R3 is provided to the interconnect 104 after the second transaction response R2 is provided to the interconnect 104, and the fourth transaction response R4 is provided to the interconnect 104 after the third transaction response R3 is provided to the interconnect 104.

Thus, the memory management system 110 ensures that the first through fourth transaction responses R1-R4 are provided to the interconnect 104 in the order that is same as the order in which the first through fourth transaction requests T1-T4 are received from the interconnect 104. Further, the utilization of the processing circuitry 120 in the memory management system 110 ensures that a number of slave connectors in the interconnect 104 is determined based exclusively on the desired throughput of the system memory 106. As a result, a design complexity, a size, and a manufacturing cost of the interconnect 104 are significantly less than that of a conventional interconnect in which the number of slave connectors is determined based on a desired throughput and a desired size of a corresponding system memory. Consequently, a design complexity, a size, and a manufacturing cost of the SoC 100 are significantly less than that of an SoC that includes the conventional interconnect. Further, as the number of slave connectors in the interconnect 104 is independent of the desired size of the system memory 106, an increase in the desired size of the system memory 106 (i.e., an increase in a number of memory segments, and in turn, a number of memory controllers) does not lead to an increase in the number of slave connectors in the interconnect 104. In such a scenario, the additional memory controllers are coupled with and controlled by the processing circuitry 120. As a result, the design complexity, the size, and the manufacturing cost of the interconnect 104 are unaffected by the increase in the desired size of the system memory 106. Hence, the scalability of the SoC 100 of the present disclosure is significantly less complex than that of the SoC including the conventional interconnect. Thus, the memory management system 110 of the present disclosure facilitates communication between the interconnect 104 and the system memory 106 more efficiently as compared to conventional systems that facilitate communication between the conventional interconnect and the corresponding system memory.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A memory management system for facilitating communication between an interconnect and a system memory of a system-on-chip (SoC), the memory management system comprising:
   a plurality of memory controllers that is coupled with the system memory; and
   processing circuitry that is coupled with the interconnect, the plurality of memory controllers, and a system controller, wherein the system controller is configured to receive configuration data associated with a configuration of the system memory;
   wherein the processing circuitry is configured to:
      receive, from the interconnect, a first transaction request associated with a first transaction, wherein the first transaction request includes a first memory address of the system memory;
      identify, from the plurality of memory controllers based on the first transaction request and the configuration data, a first memory controller that is associated with the first memory address;
      provide the first transaction request to the first memory controller for an execution of the first transaction;
      receive, from the first memory controller, a first transaction response to the first transaction request; and
      provide the first transaction response to the interconnect after a previous transaction response associated with a previous transaction request is provided to the interconnect.

2. The memory management system of claim 1, wherein the first memory controller is configured to:
   receive the first transaction request from the processing circuitry;
   execute the first transaction by accessing the first memory address; and
   generate the first transaction response based on the execution of the first transaction.

3. The memory management system of claim 2, wherein when the first transaction corresponds to a write operation, the first transaction request further includes first write data, and the first memory controller executes the first transaction by accessing the first memory address to write the first write data.

4. The memory management system of claim 2, wherein when the first transaction corresponds to a read operation, the first memory controller executes the first transaction by accessing the first memory address to read first read data stored in the system memory, and wherein the first transaction response includes the first read data.

5. The memory management system of claim 1, wherein the processing circuitry includes a decode controller that is coupled with the interconnect and the system controller, and is configured to:
   receive the first transaction request and the configuration data;
   identify, from the plurality of memory controllers, the first memory controller that is associated with the first memory address based on the first transaction request and the configuration data; and
   generate first select data that is indicative of the identified first memory controller.

6. The memory management system of claim 5, wherein the processing circuitry further includes a decoder that has:
   an input terminal that is coupled with the interconnect, and is configured to receive the first transaction request;
   a select terminal that is coupled with the decode controller, and is configured to receive the first select data; and
   a plurality of output terminals that is coupled with the plurality of memory controllers such that a first output terminal of the plurality of output terminals of the decoder is coupled with the first memory controller, wherein based on the first select data, the first output terminal is configured to output and provide the first transaction request to the first memory controller.

7. The memory management system of claim 5, wherein the processing circuitry further includes a first first-in-first-out (FIFO) memory that is coupled with the decode controller, and is configured to receive and store the first select data, and wherein the first FIFO memory is further configured to receive a first count, and output the first select data when the first count is incremented from a first value to a second value.

8. The memory management system of claim 7, wherein the first count is incremented from the first value to the second value when the previous transaction response is provided to the interconnect.

9. The memory management system of claim 7, wherein the processing circuitry further includes a plurality of FIFO memories that is coupled with the plurality of memory controllers such that a second FIFO memory of the plurality of FIFO memories is coupled with the first memory controller, and is configured to receive and store the first transaction response, and wherein the second FIFO memory is further configured to receive a second count, and output the first transaction response when the second count is incremented from a third value to a fourth value.

10. The memory management system of claim 9, wherein the second count is incremented from the third value to the fourth value when a second transaction response is provided to the interconnect, and wherein the second transaction response is a response to a second transaction request that is associated with the first memory controller and is received prior to the first transaction request and the previous transaction request.

11. The memory management system of claim 9, wherein when the first transaction response is provided to the interconnect, the second count is incremented from the fourth value to a fifth value.

12. The memory management system of claim 9, wherein the plurality of FIFO memories is configured to generate a plurality of status bits, respectively, wherein each status bit of the plurality of status bits is indicative of an occupancy status of a corresponding FIFO memory of the plurality of FIFO memories, and wherein each status bit of the plurality of status bits is: (i) deactivated when the corresponding FIFO memory of the plurality of FIFO memories is empty, and (ii) activated when the corresponding FIFO memory of the plurality of FIFO memories is occupied.

13. The memory management system of claim 12, wherein the processing circuitry further includes an encode controller that is coupled with the first FIFO memory and the plurality of FIFO memories, and is configured to:
generate and provide the first and second counts to the first and second FIFO memories, respectively;
receive, from the first FIFO memory when the first count is incremented from the first value to the second value, the first select data;
receive, from the plurality of FIFO memories, the plurality of status bits, respectively;
identify, from the plurality of FIFO memories, the second FIFO memory that is associated with the first select data; and
generate a control signal such that the control signal is activated when a status bit associated with the second FIFO memory is activated.

14. The memory management system of claim 13, wherein the processing circuitry further includes an encoder that has:
a select terminal that is coupled with the first FIFO memory, and is configured to receive the first select data;
a plurality of input terminals that is coupled with the plurality of FIFO memories such that a first input terminal of the plurality of input terminals of the encoder is configured to receive the first transaction response;
a control terminal that is coupled with the encode controller, and is configured to receive the control signal; and
an output terminal that is coupled with the interconnect, and is configured to output and provide, based on the control signal and the first select data, the first transaction response to the interconnect.

15. A system-on-chip (SoC), comprising:
a system memory;
an interconnect;
a system controller configured to receive configuration data associated with a configuration of the system memory; and
a memory management system that is configured to facilitate communication between the interconnect and the system memory, the memory management system comprising:
a plurality of memory controllers that is coupled with the system memory; and
processing circuitry that is coupled with the interconnect, the plurality of memory controllers, and the system controller, and is configured to:
receive, from the interconnect, a first transaction request associated with a first transaction, wherein the first transaction request includes a first memory address of the system memory;
identify, from the plurality of memory controllers based on the first transaction request and the configuration data, a first memory controller that is associated with the first memory address;
provide the first transaction request to the first memory controller for an execution of the first transaction;
receive, from the first memory controller, a first transaction response to the first transaction request; and
provide the first transaction response to the interconnect after a previous transaction response associated with a previous transaction request is provided to the interconnect.

16. The SoC of claim 15, wherein the first memory controller is configured to:
receive the first transaction request from the processing circuitry;
execute the first transaction by accessing the first memory address; and
generate the first transaction response based on the execution of the first transaction.

17. A method for facilitating communication between an interconnect and a system memory of a system-on-chip (SoC) by a memory management system of the SoC, the method comprising:
receiving, by processing circuitry of the memory management system from the interconnect, a first transaction request associated with a first transaction, wherein the first transaction request includes a first memory address of the system memory;
identifying, by the processing circuitry from a plurality of memory controllers of the memory management system, a first memory controller that is associated with the first memory address based on the first transaction request;
providing, by the processing circuitry, the first transaction request to the first memory controller for an execution of the first transaction;
receiving, by the processing circuitry from the first memory controller, a first transaction response to the first transaction request;
providing, by the processing circuitry, the first transaction response to the interconnect after a previous transaction response associated with a previous transaction request is provided to the interconnect; and
receiving, by the processing circuitry from a system controller of the SoC, configuration data associated with a configuration of the system memory, wherein the first memory controller is further identified based on the configuration data.

* * * * *